US012679002B2

(12) United States Patent
Philbrook

(10) Patent No.: US 12,679,002 B2
(45) Date of Patent: Jul. 14, 2026

(54) COMPOSITE PRODUCT FORMED OF COFFEE GROUNDS

(71) Applicant: Calan Philbrook, Sandwich, MA (US)

(72) Inventor: Calan Philbrook, Sandwich, MA (US)

( * ) Notice: Subject to any disclaimer, the term of this patent is extended or adjusted under 35 U.S.C. 154(b) by 169 days.

(21) Appl. No.: 18/649,289

(22) Filed: Apr. 29, 2024

(65) Prior Publication Data

US 2024/0359365 A1    Oct. 31, 2024

Related U.S. Application Data

(60) Provisional application No. 63/462,273, filed on Apr. 27, 2023.

(51) Int. Cl.
| | | |
|---|---|---|
| *B29B 13/06* | (2006.01) | |
| *B29B 7/84* | (2006.01) | |
| *B29B 13/10* | (2006.01) | |
| *B29K 63/00* | (2006.01) | |
| *B29K 105/16* | (2006.01) | |
| *B29K 511/00* | (2006.01) | |

(52) U.S. Cl.
CPC .............. *B29B 13/065* (2013.01); *B29B 7/84* (2013.01); *B29B 13/10* (2013.01); *B29K 2063/00* (2013.01); *B29K 2105/16* (2013.01); *B29K 2511/00* (2013.01)

(58) Field of Classification Search
CPC ......... B29B 13/065; B29B 13/10; B29B 7/84; B29K 2063/00; B29K 2105/16; B29K 2511/00
See application file for complete search history.

(56) References Cited

U.S. PATENT DOCUMENTS

2022/0266259 A1 *    8/2022    Kamite ................... B29B 13/10

FOREIGN PATENT DOCUMENTS

| | | | | |
|---|---|---|---|---|
| CN | 110204856 A * | 9/2019 | .............. | C08L 61/28 |
| JP | 2002275295 A * | 9/2002 | | |
| KR | 101914102 B1 * | 11/2018 | ............. | B02C 17/16 |
| WO | WO-2021042196 A1 * | 3/2021 | ............. | B29C 70/02 |
| WO | WO-2022211262 A1 * | 10/2022 | ............... | B28B 1/26 |

OTHER PUBLICATIONS

English Translation of JP2002275295 (Year: 2002).*
English Translation of KR101914102 (Year: 2018).*
English Translation of CN110204856 (Year: 2019).*
English Translation of WO-2021042196-A1 (Year: 2021).*
English Translation of WO 2022211262 (Year: 2022).*

* cited by examiner

*Primary Examiner* — Xiao S Zhao
*Assistant Examiner* — Victoria Bartlett
(74) *Attorney, Agent, or Firm* — DOHERTY WALLACE PILLSBURY MURPHY P. C.

(57) ABSTRACT

A method of manufacturing a composite product with spent coffee grounds, having steps of: acquiring spent coffee grounds; pre-drying the spent coffee grounds; drying the spent grounds that have been pre-dried, to form base material; organizing the base material by size; forming base products from the base material, including a resin product and a hardener product; forming a mixed product from the base products; and forming a final product from the mixed product, wherein the final product is the composite product.

19 Claims, 8 Drawing Sheets start acquiring spent coffee grounds — 100 pre-drying the spent coffee grounds — 200 drying the spent grounds that have been pre-dried. to form base material — 300 organizing the base material by size — 400 forming base products — 500 forming a mixed product — 600 forming the final product from the mixed product — 700 end

COMPOSITE PRODUCT FORMED OF COFFEE GROUNDS

CROSS REFERENCE

This application claims priority to U.S. 63/462,273 filed on 27 Apr. 2023, the entire disclosure of which is incorporated herein by reference.

BACKGROUND

The disclosure relates to composite products and more specifically to composite products formed of coffee grounds.

Tens of billions of pounds of coffee grounds are generated annually, worldwide. Most of the coffee grounds end up as trash. Some coffee roasting facilities and restaurant chains dispose of spent coffee grounds in their privately owned woods, e.g., behind their roasting facility. The grounds are dumped, then periodically compacted to make room for more waste product. There is a need to utilize these grounds to thereby minimize waste.

BRIEF SUMMARY

Disclosed is a method of manufacturing a composite product with spent coffee grounds, including: acquiring spent coffee grounds; pre-drying the spent coffee grounds; drying the spent grounds that have been pre-dried, to form base material; organizing the base material by size; forming base products from the base material, including a resin product and a hardener product; forming a mixed product from the base products; and forming a final product from the mixed product, wherein the final product is the composite product.

In addition to one or more aspects disclosed herein or as an alternate, acquiring spent coffee grounds includes: storing the spent grounds in a recycling receptacle; and removing inorganic material.

In addition to one or more aspects disclosed herein or as an alternate, pre-drying the spent coffee grounds includes: draining the spent grounds of water; air drying the spent grounds; and transferring the spent grounds into a drying vat.

In addition to one or more aspects disclosed herein or as an alternate, drying the spent coffee grounds includes: monitoring a moisture content of the spent grounds until a target moisture content is obtained; transferring the spent grounds into a powered dryer; transferring the spent grounds onto a baking pan; transferring the pan into a humidity-controlled environment; and periodically agitating or mixing the spent grounds.

In addition to one or more aspects disclosed herein or as an alternate, transferring the pan into a humidity-controlled environment includes transferring the pan into an oven.

In addition to one or more aspects disclosed herein or as an alternate, drying the spent coffee grounds further includes utilizing open air convection, conduction, radiation.

In addition to one or more aspects disclosed herein or as an alternate, organizing the base material by size includes: screening or sifting the base material into fine and course granules; vacuum sealing the spent grounds based on size; and storing the spent grounds.

In addition to one or more aspects disclosed herein or as an alternate, organizing the base material by size further includes milling a quantity of the base material into a flour.

In addition to one or more aspects disclosed herein or as an alternate, forming the resin product includes: mixing resin with one or more of flour, fine, and course granules of the base material to define a resin product; and degassing the resin product.

In addition to one or more aspects disclosed herein or as an alternate, degassing the resin product includes one or both of: manual degassing; and powered degassing.

In addition to one or more aspects disclosed herein or as an alternate, forming the hardener product includes: mixing a hardener with one or more of flour, fine, and course granules of the base material to define the hardener product; and degassing the hardener product.

In addition to one or more aspects disclosed herein or as an alternate, degassing the hardener product includes one or both of: manual degassing; and powered degassing.

In addition to one or more aspects disclosed herein or as an alternate, forming the mixed product from the base products includes: heating the resin product and the hardener product to a first working temperature; mixing the resin and hardener products with each other; and degassing the mixed product.

In addition to one or more aspects disclosed herein or as an alternate, forming the mixed product from the base products further includes introducing one or more additives into the mixed product.

In addition to one or more aspects disclosed herein or as an alternate, degassing the mixed product includes one or both of: manual degassing; and powered degassing.

In addition to one or more aspects disclosed herein or as an alternate, forming the final product from the mixed product includes one or more of: pouring the mixed product into a mold; pouring the mixed product into an injection molding device; and forming a filament for additive manufacturing.

In addition to one or more aspects disclosed herein or as an alternate, forming the final product from the mixed product includes: pouring the mixed product into the mold; introducing a structural insert in the mixed product that is in the mold; and machining product of the mold into the final product.

In addition to one or more aspects disclosed herein or as an alternate, forming the final product from the mixed product includes: pouring the mixed product into the injection molding device; and injection molding the final product.

In addition to one or more aspects disclosed herein or as an alternate, forming the final product from the mixed product includes: forming the filament for additive manufacturing; and additively manufacturing the final product.

In addition to one or more aspects disclosed herein or as an alternate, the method further includes coating the final product in a resin-based colorant to change its appearance.

Further disclosed is a composite product formed by a method having one or more of the above disclosed aspects.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

A process of making a composite product 1 (FIG. 12) from spent coffee grounds 2 (FIG. 2) will be disclosed.

Figure 2:
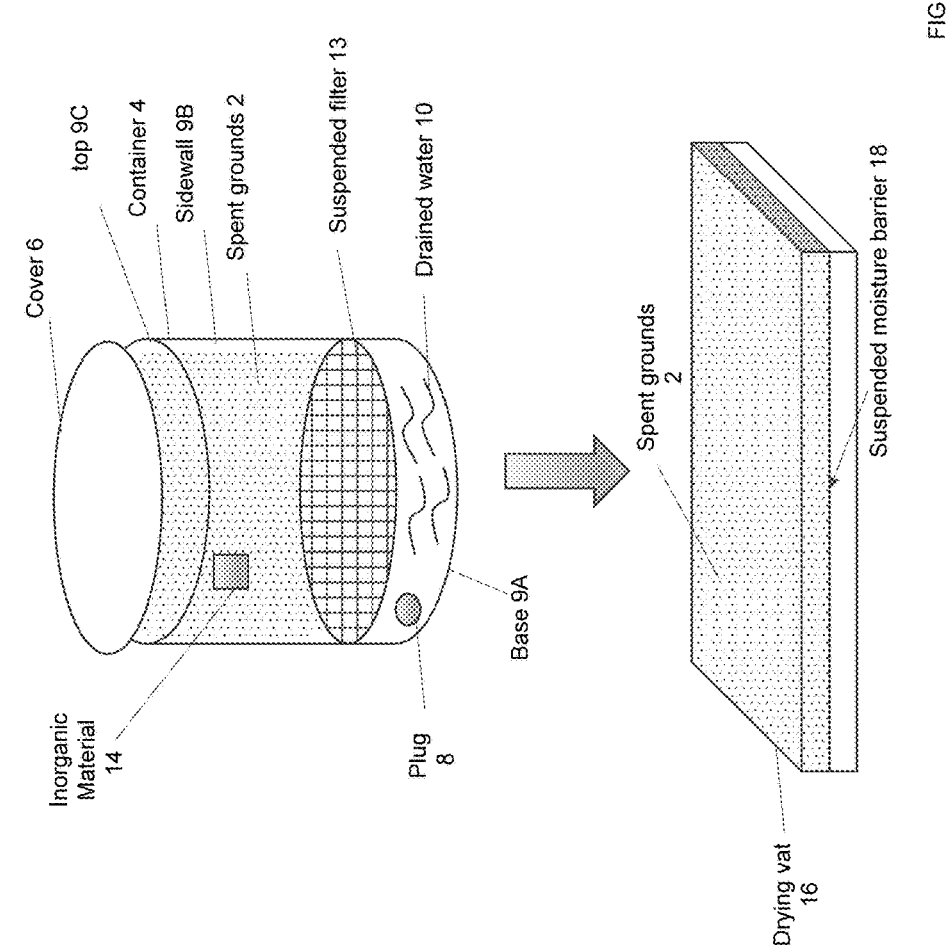
FIG. 2 shows a receptacle and a drying vat, each with spent grounds therein.
Figure 1:
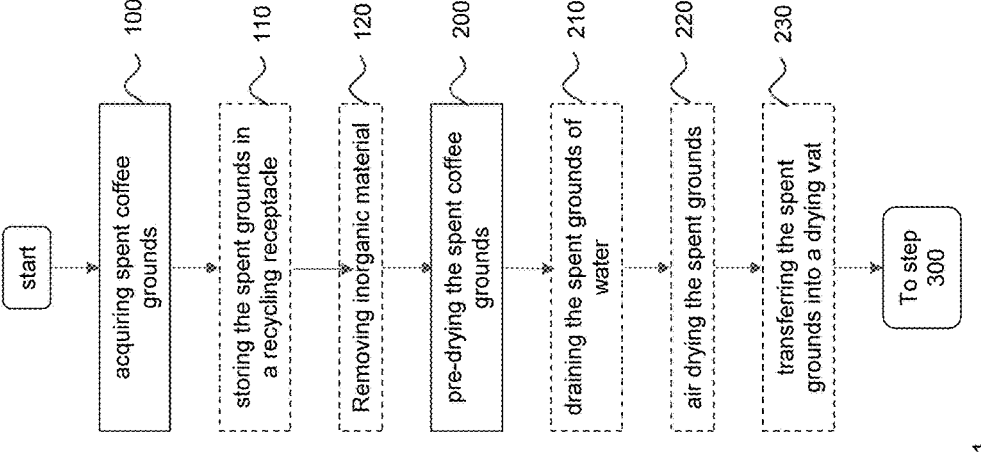
FIG. 1 is a flowchart showing portions of a disclosed process of manufacturing a composite product from coffee grounds, showing steps related to acquiring spent coffee grounds and pre-drying the spent grounds.

Turning to FIGS. 1 and 2, as shown in block 100, a first step of the process includes acquiring spent coffee grounds (hereinafter the acquiring step). That is, rather than disposing of spent grounds 2, the spent grounds 2 are recycled. For example, as shown in block 110, the acquiring step may include storing the spent grounds 2 that have been acquired in a recycling receptacle or container 4. The recycling container 4 may be a container, such as a five foot by eight-foot utility trailer having sidewalls and a base that are formed of pressure-treated wood slats lined with a mesh fabric for allowing water to pass through the base. Or as shown in FIG. 2, the container 4 may be a five (5)-gallon plastic cylindrical bucket having a base 9A and extending via a sidewall 9B to a top 9C, with a cover 6 to cover the top 9C, and a removable plug 8 near the base 9A to drain water 10.

The container 4 may include a fabric mesh filter 13 having a shape (e.g., disk-shape) and surface area that conforms with the shape and top area of the container 4. The filter 13 may be suspended, e.g., two (2) inches above the base 9A.

Water may pass through the filter 13, beginning a drying process prior to acquisition of the spent grounds 2. It is to be appreciated that the container 4 may be reusable. As shown in block 120, the acquiring step may include removing inorganic material 14, e.g., coffee filters, from (e.g., suspended in) the grounds in the container 4, which may be optionally kept for further utilization, to make coffee-based wood-like pellets for fuel. This is because dry coffee may burn longer, brighter, hotter, and cleaner than wood.

As shown in block 200, second step of the process includes pre-drying the spent grounds 2 (hereinafter the pre-drying step). As indicated above, and as shown in block 210 the pre-drying step may include draining the spent grounds 2 of the water 10. The drained water 10, which may be acidic, may be captured and utilized for plants and incorporated into a plant food applicator. As shown in block 220, the pre-drying step may also include air drying the spent grounds 2 after draining. As shown in block 230, the pre-drying step may include transferring the spent grounds 2, after air drying, into a drying vat 16 having a suspended moisture barrier 18 to air-dry. It is to be appreciated that the recycling container 4, at this time, may be rinsed and thus ready to be reused.

Figures 3, 4:
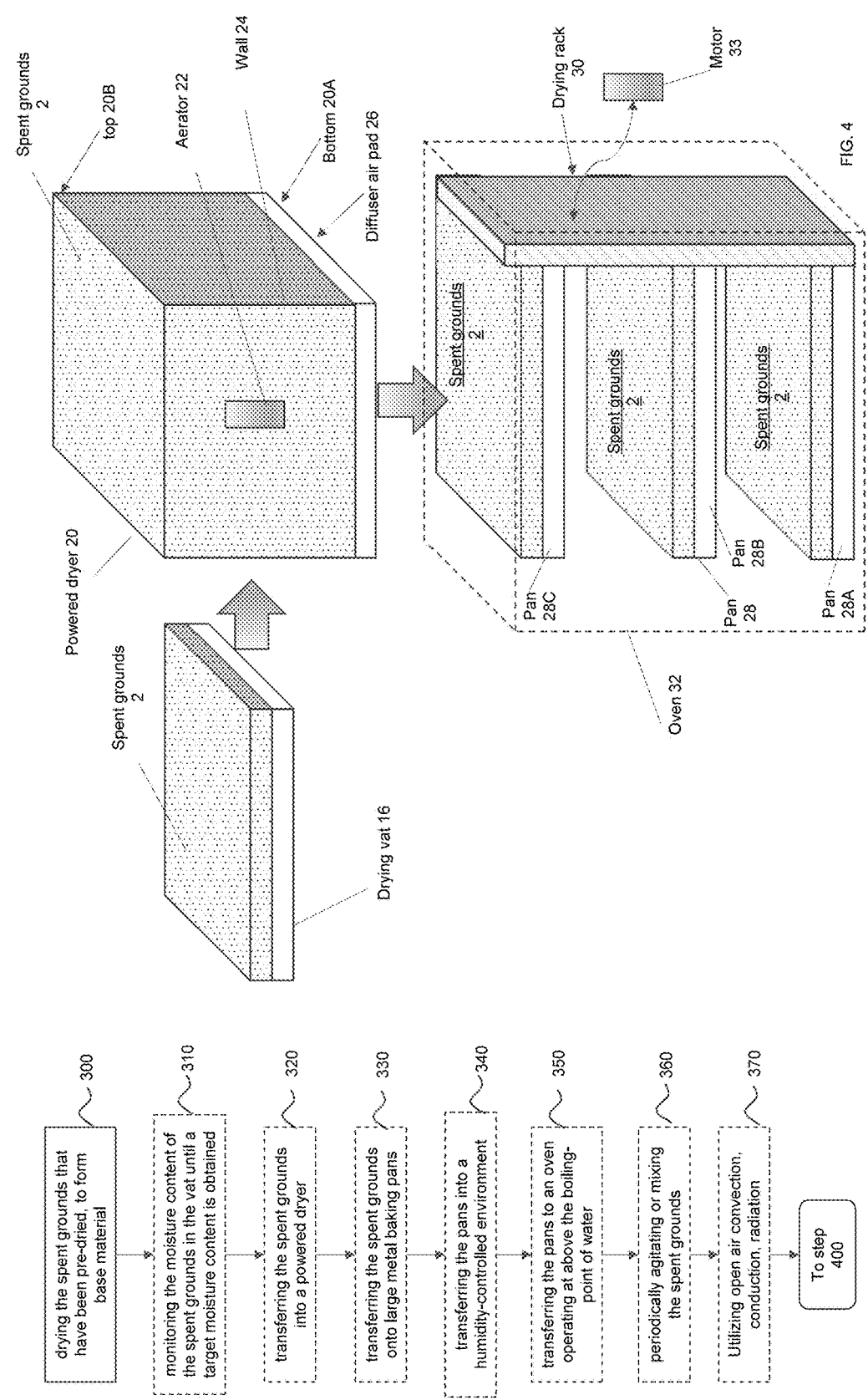
FIG. 3 is a flowchart showing additional portions of the disclosed process of manufacturing the composite product, showing steps related to drying the spent grounds that have been pre-dried, to form base material.
FIG. 4 shows a drying vat, a powered dryer, and a drying rack in an oven, each with spent grounds therein.

Turning to FIGS. 3 and 4, as shown in block 300, a third step of the process includes drying the spent grounds 2 that have been pre-dried, to form base material (hereinafter the drying step). Multiple drying processes may be undertaken at this stage, depending on available resources. As shown in block 310, the drying step may include monitoring the moisture content of the spent grounds 2 in the vat 16 until a target (e.g., predetermined or desired) moisture content is obtained. The target moisture content may be obtained when the spent grounds 2 are flammable, which may be when a tablespoon of spent grounds 2 is able to hold a candle-flame for at least ten (10) seconds.

As shown in block 320, the drying step may include transferring the spent grounds 2 into a powered dryer 20, such a commercial grain drier, which may be equipped with an aerator 22 such as an airbrator (shown schematically between the bottom 20A and top 20B of the powered dryer 20). Aeration devices keep powders and solids from the spent grounds 2 in motion, so they do not pack in hoppers, e.g., along bin walls 24 or other components of a vessel of the dryer 20. An airbrator combines aeration and vibration to address difficult material flow applications such as fly ash, cement, flour, lime, sand, salt or food-grade applications. A diffuser air pad 26, located in the powered dryer 20 (shown schematically at the bottom 20A of the powered dryer 20), helps promote material flow by preventing compaction and urging material to move fluidly for easier handling.

As shown in block 330, the drying step may include transferring the spent grounds 2 onto metal baking pans 28 (three pans 28A-28C are shown as a nonlimiting example) or sheets and spreading the spent grounds 2 into a thin layer, e.g., of approximately an inch in depth (as one nonlimiting example), to improve drying speed. As shown in block 340, the drying step may include transferring the baking pans 28 onto a drying rack 30 in a humidity-controlled environment, where the humidity is kept as low as, e.g., zero percent. For example, as shown in block 350, the drying step may include transferring the pans 28 to an oven 32 as the humidity-controlled environment. The oven 33 may operate at, e.g., two hundred and fifteen (215) degrees Fahrenheit (F), which is just above the boiling-point of water under standard atmospheric conditions, to stimulate evaporation and expedite the drying process. As shown in block 360, the drying step may include periodically agitating or mixing the spent grounds 2 to aid in the drying process, e.g., with a motor 33 attached to the drying rack 30. As shown in block 370, the drying step may include utilizing open air convection, conduction, radiation (solar), and other drying methods undertaken at this stage as well.

Figure 6:
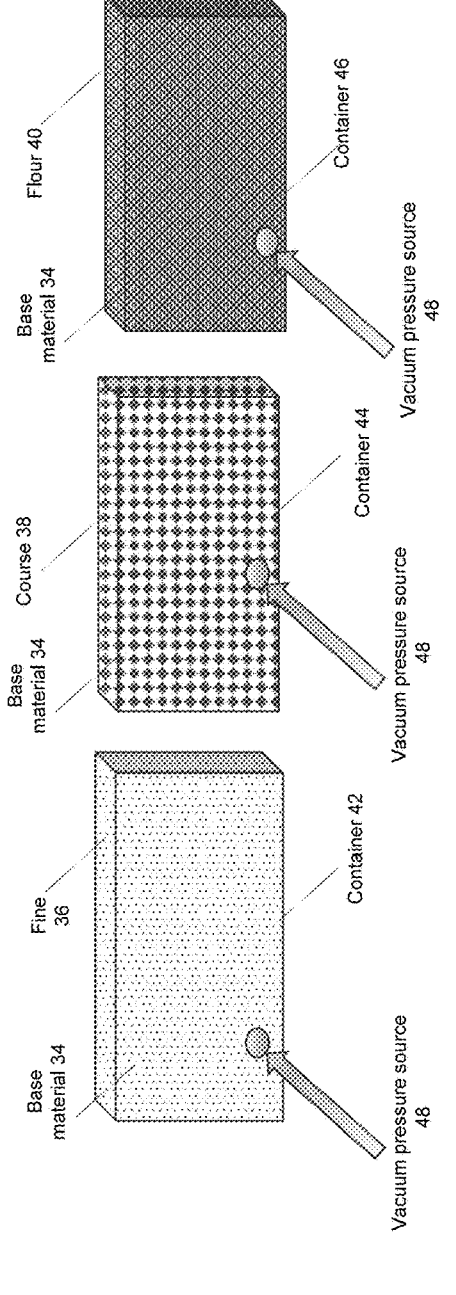
FIG. 6 shows spent grounds separated into fine, course and flour types in separate containers.
Figure 5:
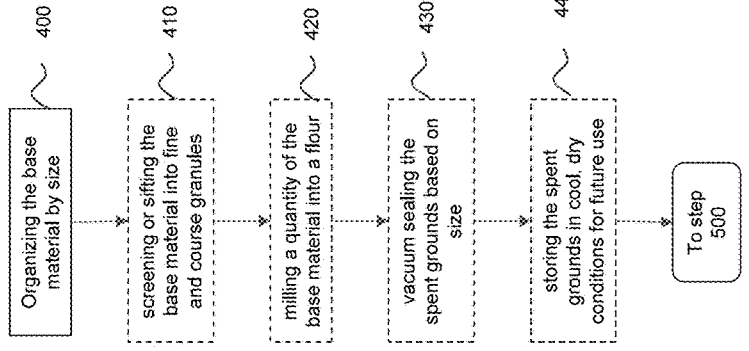
FIG. 5 is a flowchart showing additional portions of the disclosed process of manufacturing the composite product, showing steps related to organizing the base material by size.

Turning to FIGS. 5 and 6, as shown in block 400, once a targeted moisture content is achieved, the spent grounds 2 represent the base material 34, or raw material, i.e., the material utilized to form the product 1. The method includes organizing the base material 34 by size (hereinafter the organizing step) for additional processing. As shown in block 410, the organizing step may include screening or sifting the base material into fine 36 and course 38 granules. As shown in block 420 the organizing step may include milling a quantity of the base material into a flour 40 (or powder). The different sizes of separated granules may be kept in separate containers (or packages) 42-46. As shown in block 430, the organizing step may include vacuum sealing, with a vacuum pressure source 48, the spent grounds 2 based on size, e.g., fine 36, course 38 or flour 40.

As shown in block 440, the organizing step may include storing the spent grounds 2 in cool, dry conditions for future use. It is to be appreciated that the grounds 2 in the vacuum sealed containers 42-46 may have a prolonged shelf life. The processed (dry/sorted) coffee grounds are stored in epoxy resin; this stops decomposition of the grounds, allows the resins to deeply penetrate into the coffee to better adhere to its hardening binder, and eliminates water/humidity from being reabsorbed into the coffee.

Figures 7, 8:
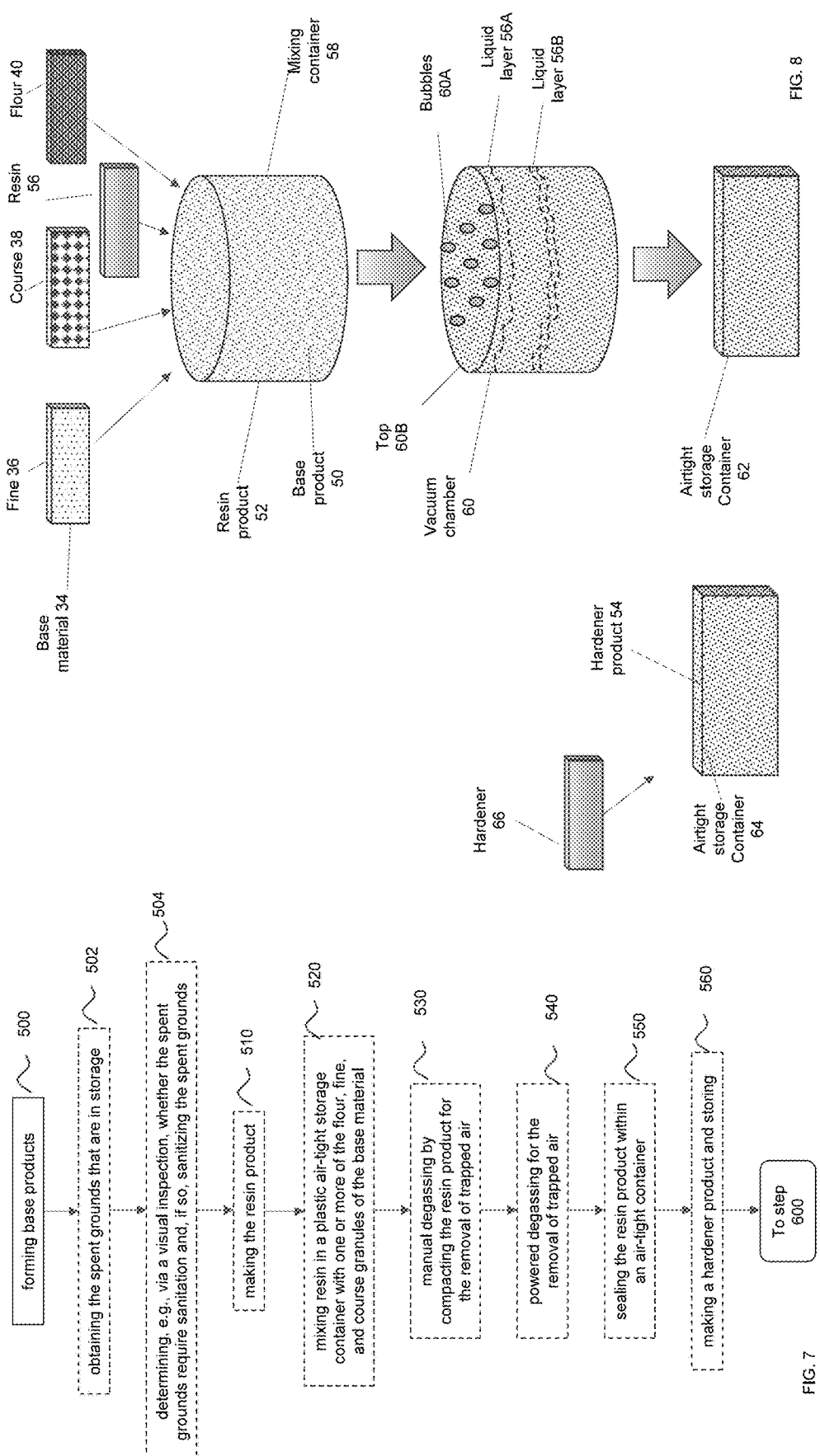
FIG. 7 is a flowchart showing additional portions of the disclosed process of manufacturing the composite product, showing steps related to forming base products.
FIG. 8 shows the spent grounds utilized to form a resin product disposed in a mixing container, a vacuum chamber for mixing the resin product, and a storage container that stores the resin product.

Turning to FIGS. 7 and 8, as shown in block 500, a fifth step of the disclosed process is forming base products 50 including a resin product 52 and a hardener product 54 from the base materials (hereinafter the base product forming step).

As shown in block 502, the method may include obtaining the spent grounds 2 that are in storage (FIG. 6). As shown in block 504, the method may include determining, e.g., via a visual inspection, whether the spent grounds 2 require sanitation and, if so, sanitizing the spent grounds 2. That is, if the grounds 2 are stored for a certain number of days, based on visual inspection, the grounds 2 may require a sporicide (biodegradable disinfectant) to be applied before they are used.

That is, as shown in block 510, the base product forming step includes making the resin product (the resin product forming step) from the spent grounds 2 that have been obtained from storage. As shown in block 520, the resin product forming step may include mixing, e.g., in a mixing container 58, an epoxy resin 56, such as JC-022AB, manufactured by Huizhou Jincheng Composite Materials Co., Ltd. Guangdong, China, as a non-limiting example, with one or more of the fine 36, course 38 and flour 40 granules of the base material 34. The container 58 may be a plastic air-tight storage container, utilized for minimizing the incorporation of air. As shown in block 530, the resin product forming step may include manual degassing by compacting the resin product 52 for the removal of trapped air. As shown in block 540, the resin product forming step may include powered degassing of the resin product 52, e.g., in a degassing vacuum chamber 60 brought to negative pressure of, e.g., negative twenty-nine (−29) inches of HG. The resin product 52 may remain in the degassing chamber 60 until substantially all air is extracted, e.g., air is reduced below a threshold. Bubbles 60A may form on top of the resin product 52, e.g., near a top 60B of the chamber 60, because of trapped air being released. When the formation of bubbles ends, all air may be presumed to have been extracted and degassing may cease.

A liquid top layer 56A of epoxy resin 56 may exist on the resin product 52 in which bubbles may form. If there is not enough epoxy resin 56 within the resin product 52 to create a liquid top layer 56A then vacuum degassing may be effective to the extent a liquid layer 56B exists within the resin product 52. As shown in block 550, the step of making the resin product may include sealing the resin product 52 within an air-tight storage container 62, and storing until needed.

As shown in block 560, the base product forming step includes making the hardener product 54 and storing in an airtight container 64. The hardener product 54 is formed the same way the resin product, except that a hardener 66 is utilized. That is, steps 510-550 (FIG. 7) are repeated with the inclusion of a hardener 66 added to the mixing container 58 during step 520. As with the epoxy resin 56, the hardener 66 may be a product manufactured by Huizhou Jincheng Composite Materials Co., Ltd. Guangdong, China, as a non-limiting example.

It is to be appreciated that the specifics of the epoxy resin (or for simplicity, a resin) 56 and hardener 66 disclosed herein are merely for reference. The resin and hardener implicated by this disclosure are not intended on limiting the scope of the embodiments. For example, alternate resins may include, at least, polyester resin, polyurethane resin, acrylic resin, latex resin, silicone resin, recycled plastic, which may be melted for use in the disclosed process, and plastic bottles made of polyethylene terephthalate (PET). In addition, a polymerization of petroleum-based compounds mixed with coffee may be effective and allow for a nearly 100% recycled product. The use of HDPE (high density polyethylene), PVC (polyvinyl chloride), LDPE (low density polyethylene), PP (polypropylene), and PS (polystyrene) is also within the scope of the disclosure. In one embodiment, the plastic based (poly) resin and epoxy may be replaced by non-plastic alternatives including plant based, organic resin-like materials, bio engineered resins, recyclable non-plastic materials, and recycled non-plastic materials. That is, the utilization of plant-based resins, including conifers, flowering resinous plants, and organic material, may entirely or partially replace plastic resin. In one embodiment, bioengineered resins may be utilized, which are formed as hybrid composites that are partially or entirely man-made from organic material including seeds, pulp and recycled materials.

Figure 10:
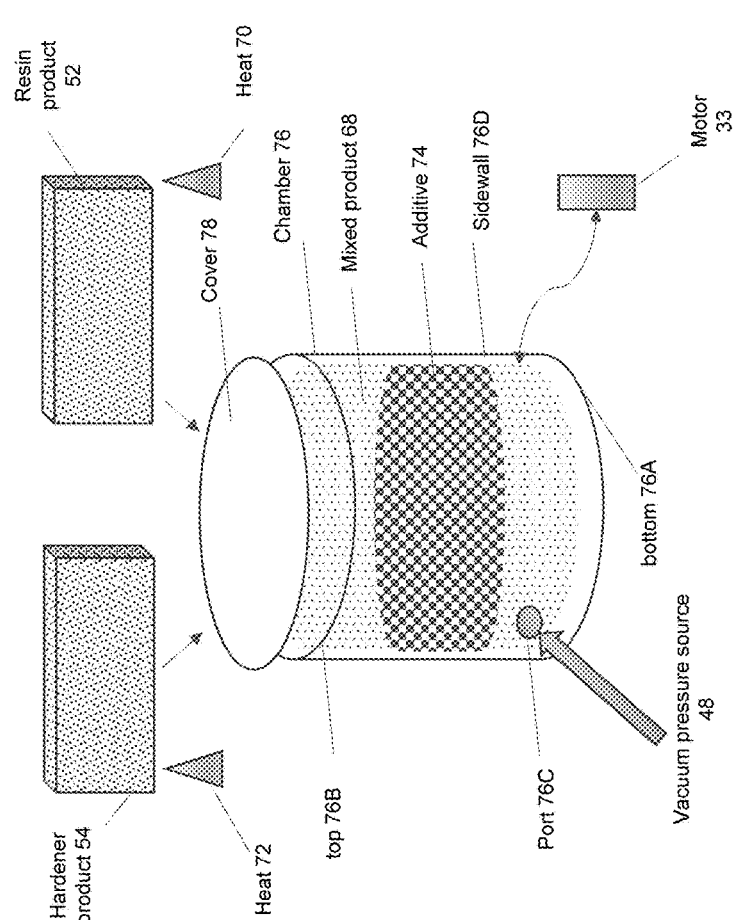
FIG. 10 shows a container with resin product, hardener product and additives mixed therein.
Figure 9:
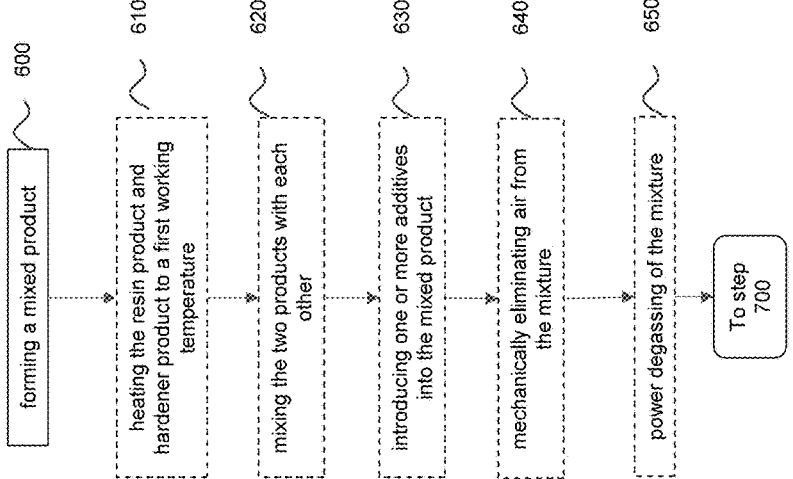
FIG. 9 is a flowchart showing additional portions of the disclosed process of manufacturing the composite product, showing steps related to forming a mixed product.

Turning to FIGS. 9 and 10, as shown in block 600, a sixth step of the disclosed process is forming a mixed product 68 from the resin product 52 and the hardener product 54 (hereinafter the mixed product forming step).

As shown in block 610, the mixed product forming step may include heating the resin product 52 and hardener product 54 to a first working temperature T1 of about room temperature, e.g., between 75-80 degrees F., e.g., utilizing heating sources 70, 72. Heat may be directly applied to the resin product 52 and hardener product 54 to increase its temperature. Raising the temperature of the resin product 52 and hardener product 54 lowers their viscosity, making it easier to incorporate the two products into one another. As shown in block 620, the mixed product forming step may include mixing the two products with each other. Alternatively, when a relatively shorter working time is targeted, both products 52, 54 may be combined and then brought to the first working temperature T1.

As shown in block 630, the mixed product forming step may include introducing one or more additives 74 into the mixed product 68. It is to be appreciated that different ratios of the resin and hardener products 52, 54 and the additives 74 may impact the material characteristics, the final product 1, including the look (e.g., aesthetics), feel, water resistance, hardness, compression yield strength, tensile strength (e.g., durability), and other physical characteristics, including color. Color may be modified by the utilization of colorants as an additive 74, e.g., pigment powder (e.g., mica) for adjusting tint/color. A bleaching agent as an additive 74 may be utilized for changing the color of the mixtures. Different ratios of the resin and hardener products 52, 54 may be utilized to develop different types of final product 1, depending on the overall target characteristics. Polyurethane as an additive 74, for example, can be utilized to change the consistency of resin and hardener products 52, 54 and the sheen of the final product 1.

Polyurethane ratios may be controlled depending on a targeted application and results. A one to ten ratio of polyurethane to mixed product 68 may be an example of a targeted ratio. Wood fibers as an additive 74 may be utilized to obtain a targeted color, density, workability, and texture, for example. Wood fibers may include sawdust, wood shavings, and ground/mulched wood. Further, additives 74 may modify a viscosity of the mixed product 68. Solvents as an additive 74, such as denatured alcohol or acetone, may be utilized to lower a viscosity of the mixed product 68, allowing for easier mold pouring, and longer working time prior to curing. An acetone thinning ratio may target one-part acetone as an additive 74 to ten-parts of the mixed product 68. A denatured alcohol ratio may target one-part denatured alcohol as an additive 74 to seven-parts of the mixed product 68. These ratios are not intended on limiting the scope of the embodiments. The incorporation of resin and hardener products 52, 54 to form the mixed product 68 can be performed by various methods depending on the final product 1 being manufactured.

According to an embodiment, one of the additives being utilized is titanium Dioxide, this adds a pearlescent finish when added to the colored powder, lightens the raw base material 34 when mixed directly, and adds some UV protection to the final product. Another additive is colored chalk powder as an alternative to mica powder for coloring products (though mica powder may be utilized for a certain aesthetic). Rather than mixing in the color powder directly into the raw base material 34, the inside of a mold (e.g., mold 106, discussed below) is coated with powder which provides a relatively more intense color and adds additional UV protection.

As shown in block 640, the mixed product forming step may include mechanically eliminating air from the mixed product 68. For example, the mixing step can be performed by filling a degassing chamber 76 from its bottom 76A to its brim (e.g., top) 76B, thus eliminating a top layer of air, covering with a cover 78, and mixing via vibration with a motor 33, similar to the operation of a paint mixer. As shown in block 650, the mixed product forming step may include power degassing of the mixed product 68 with vacuum pressure, via the vacuum pressure source 48 fluidly coupled to the chamber 76, e.g., via a port 76C in a sidewall 76D. The vacuum pressure may be set, e.g., to negative twenty-nine inches (−29") of HG, leaving ample space in the degassing chamber 76 to allow for expansion of the mixed product 68 while curing. It is to be appreciated that an amount of time to degas is dependent on how much air entered the mixed product 68 when mixing. It is to be further appreciated that degassing this way may increase the viscosity of the mixed product 68, which should be accounted for when pouring.

The above embodiment addresses storage of the resin and hardener products 52, 54 before mixing. However, the resin and hardener products 52, 54 may be mixed at the time they are prepared, e.g., by combining equally, by volume, the resin and hardener products 52, 54, heating to the working temperature T1, and mixing in spent grounds 2 as needed.

Figures 11, 12:
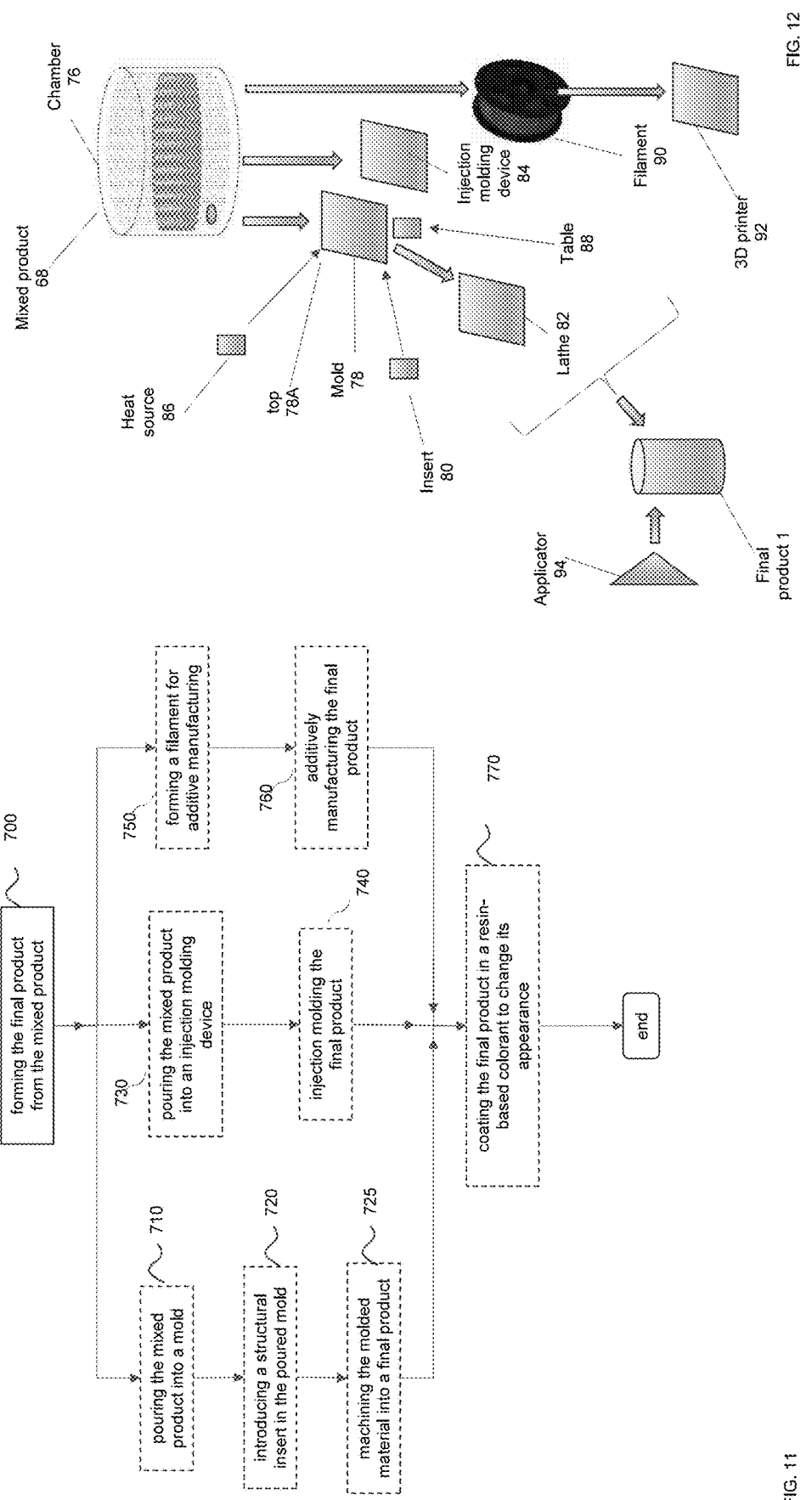
FIG. 11 is a flowchart showing additional portions of the disclosed process of manufacturing the composite product, showing steps related to forming the final product from the mixed product.
FIG. 12 shows a product mixture utilized to form a final product via a pour mold, an injection mold device, and a filament for a 3D printer.

Turning to FIGS. 11 and 12, as shown in block 700, the disclosed method includes forming the final composite product 1 (or final product) from the mixed product 68 (hereinafter the final product forming step). A preferred window of time to process the mixed product 68 into the final product 1 is (40) forty minutes at approximately room temperature, e.g., approximately seventy-five (75) to eighty (80) degrees F. (preferably seventy seven (77) degrees F.). Otherwise, there may be an increased risk of the mixed product 68 curing, if no additives/solvents (e.g., additives 74, FIG. 10) are utilized.

As shown in block 710, the final product forming step may include pouring the mixed product 68 from the chamber 76 into a mold 78. As shown in block 720, the final product forming step may include introducing a structural insert 80, e.g., a pinecone, in the poured mold to enable wood-turning the molded material on a lathe 82. For example, when turning the final product on the lathe 82, the final product 1 may be machine cut into segments. That is, as shown in block 725, the final product forming step may include machining a product of the mold into the final product 1. As shown in block 730, the final product forming step may include pouring the mixed product 68 into an injection molding device 84. As shown in block 740, the final product forming step may include injection molding the final product 1 from the mixed product 68.

There are different types of molds that can be utilized. Silicon molds provide relative ease in deforming and can be reused many times due to their relative ease of cleaning. Plastic molds may be utilized as they can be flexible enough to de-mold once the base material has set (e.g., cured). If the elimination of air bubbles is preferred for the final product 1, an injection mold may be preferred. For a poured mold, heat applied during a pouring process (at block 710), into the mold, may minimize the occurrence of air bubbles. A heat source 86 which may be a heat gun, or direct flame, may be directed at a poured stream of the mixed product 68 for mitigating air bubbles entering the mold 78. Once the mold 78 is filled, the heat source 86 may be applied to a top 78A of the mold 78 to eliminate fine air bubbles that may have formed.

For curing, the mold 78 may be placed on a level surface in a location with an ambient temperature of approximately standard room temperature, e.g., at least seventy-five (75) to eighty (80) degrees F. (preferably seventy seven (77) degrees F.). Curing/Hardening conditions may be ideal at approximately seventy seven (77) degrees Fahrenheit, creating the relatively strongest bond, though taking a relatively longer to cure (e.g., eight hours or more, depending on a thickness of the final product 1 being made). A maximum hardening temperature may be approximately one hundred and thirty one (131) degrees F.

The mold 78 may be placed on a vibration table 88 while curing, as vibrations that agitate the mixed product 68 may aid in the release of trapped air. Curing times may range from eight to fourteen (8-14) hours to de-mold depending on a depth of the final product 1, and a minimum of seventy-two (72) hours at the working temperature T1 to fully cure. Smaller and more detailed molds 78 may be obtained by injecting the mold 78 with soapy water, and then rubbing the mold 78 against the cured final product 1, inside the mold 78, to help release the final product 1.

As shown in block 750, the final product forming step may include forming a filament 90 for additive manufacturing of the final product 1. As shown in block 760, the final product 1 forming step may include additively manufacturing the final product 1 with an additive manufacturing device, e.g., a 3D printer 92.

As shown in block 770, regardless of the process of forming the final product 1, the final product forming step may include coating the final product 1 in a resin-based colorant, e.g., with an applicator 94, to change its appearance. Additionally, bleaching may be applied prior to curing to obtain a targeted relatively lighter color final product.

The final product 1 may then be inspected for defects and finished and may be touched up as required to obtain a target aesthetic. Minimal finishing may be needed due to the way final product 1 cures. Depending on the ratio of epoxy resin 56, hardener 66, spent grounds 2, and additives 74, the final product 1 may cure to a high gloss finish, or a matt, rough finish. The finish may depend on the volume of spent grounds 2 that are utilized, and the size of the granules (fine 36, course 38, flour 40). Finishing may include cutting, turning, drilling, sanding, bored, polishing, buffing, etc., to the final product 1. Depending on the final product 1, assembly, gluing, coloring, and other applications may be applied.

Figure 13:
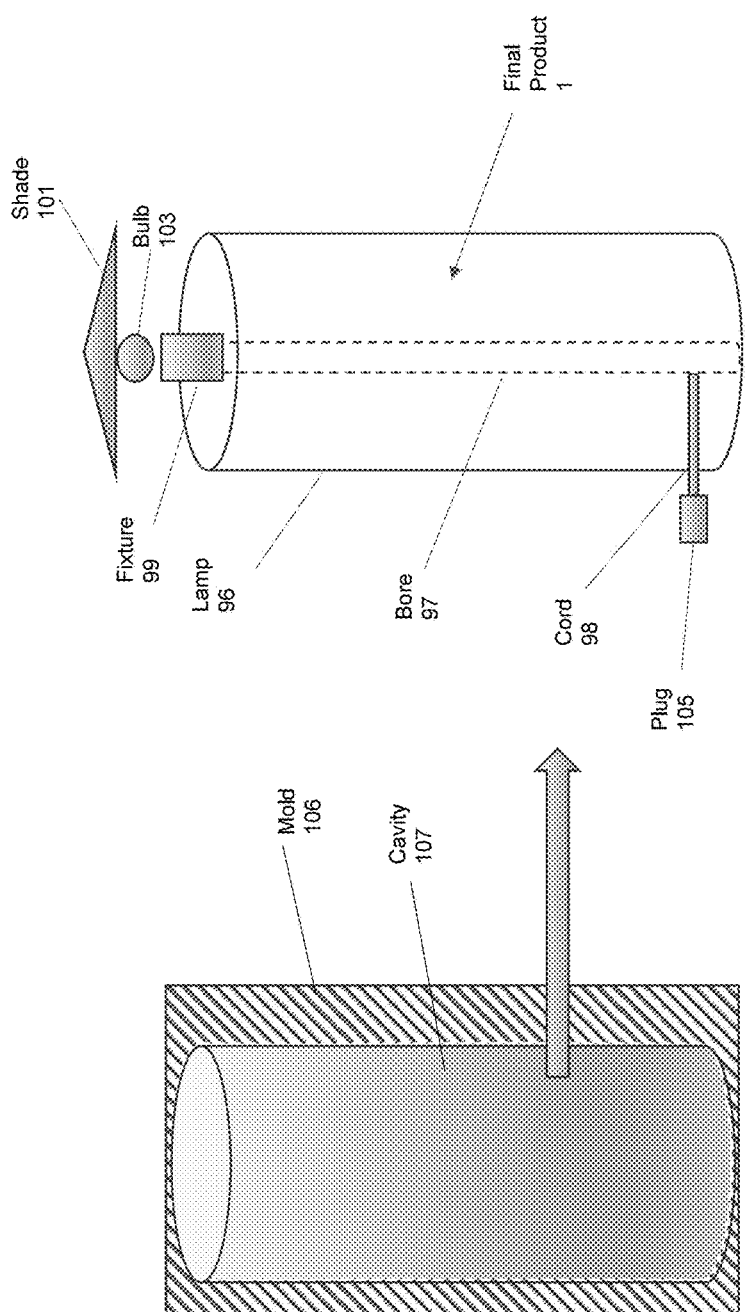
FIG. 13 shows a lamp manufactured according to the disclosed process.

Turning to FIG. 13, a lamp 96, for example, may be formed of a cylinder-shaped mold filled with the mixed product 68, then turned on a wood lathe 82 to shape to its predetermined form. Once shaped, the final product 1 may be sanded, polished, then a bore hole 97 may be formed through the center of the lamp 96, to thread a power cord 98. A light fixture 99 may be installed on the top of the final product 1 to affix a lamp shade 101 and bulb 103. The power cord 98 may be wired to the light fixture 99 through the center bore 97 and a plug 105 may be installed at the bottom end. Alternatively, the lamp 96 may be formed utilizing a mold 106, a portion of which is shown in FIG. 13. The mold 106 may have a cavity 107 that is shaped to define the lamp 96. Utilizing the mold 106 may eliminate certain steps that are otherwise required for forming the lamp 96, such as shaping, sanding, and possibly polishing. Additive manufacturing the final product may also avoid many of the requisite finishing steps.

Each of the materials utilized herein may be FDA approved and free of VOCs, BPAs, and be non-toxic. The mixed product may be derived from a one-to-one ratio by volume of resin product 52 to hardener product 54. This ratio may change with application and targeted characteristics. A ratio of flour grounds 40, fine grounds 36, and course grounds 38 to epoxy resin 56 may depend on the final product 1. Flour 40 is less prone to trap air compared to granules, compacts to a relatively dense final product 1, cures to relatively smooth surface glass, and has a visual appearance that is deep black in color. A final product 1 intended to be turned on a lathe 82 may do so more easily when derived from flour 40. Granules trap more air, increasing the potential of small air pockets throughout a final product 1. The density of the final product 1 derived from granules may be more easily manipulated to a state that can either float in water or sink. Whether prepared from a flour or other granules, the final product 1 may be able to be cut, drilled, turned, and sanded.

Examples of composite product 1 made from the above disclosed process include 3D-printed structures such as automotive structures, including dashboards, door panels, accents, cabinetry, storage, organizational implements, countertops, decking and flooring, Fencing and furniture, including chairs, desks, coffee tables, nightstands, end tables, dining tables, dressers, chests, bed frames, waterproof patio and pool furniture, gazebo, pergolas. Home décor manufactured from the disclosed process may include clocks, candles, planters, vases, picture frames. Jewelry manufactured from the disclosed process may include earrings and bracelets. Kitchenware manufactured from the disclosed process may include plates, bowls, cups, flatware, jars, rolling pins, cutting boards, knife and tool handles. Lamps and light fixtures, patio pavers, tiles, and bricks may be manufactured from the disclosed process.

The embodiments provide plastic-alternative components, including health care and technology products. Plastic-alternative construction materials manufactured from the disclosed process may include light switch and outlet covers, wall anchors, hardware (washers, screws), knobs, pulls, hinges, brackets. PVC-alternative products, railroad ties and toys may be manufactured from the disclosed process. The embodiments provide a functional raw material, formed of a coffee ground that is a seed of the coffee cherry flower, has strikingly similar characteristics to wood, boards, planks from which structures are typically built. The material can be cut, drilled, screwed, planed, sanded, turned, glued, and polished the way that wood can. In comparison, for example, plastic cannot be planed, sanded, or turned as it breaks, chips, cracks, and/or melts.

Figure 14:
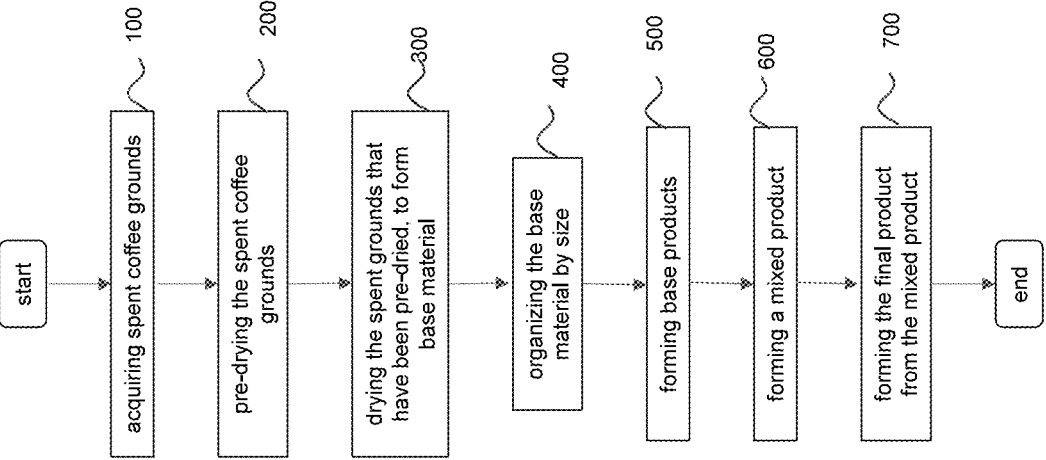
FIG. 14 is another flowchart showing the disclosed process of manufacturing the composite product from coffee grounds.

Turning to FIG. 14, another flowchart shows a high-level of the process steps identified herein. At block 100, the process includes acquiring spent coffee grounds 2 (FIG. 2). At block 200, the process includes pre-drying the spent coffee grounds 2 (FIG. 4). At block 300, the process includes drying the spent grounds 2 that have been pre-dried, to form the base material 34 (FIG. 6). At block 400, the process includes organizing the base material by size (FIG. 6). At block 500, the process includes forming base products 50 (FIG. 8). At block 600, the process includes forming the mixed product 68 (FIG. 10). At block 700, the process includes forming the final product 1 from the mixed product 68.

In sum, the process includes, acquire the grounds, dry them, sorting by size, grind/mill the grounds to an appropriate size, storing the grounds in resin, mixing additives (e.g. hardener, UV protectors (TiO2, HALS, and Benzophenones), colorant if the product is to be colored inside and out, and other additives that affect viscosity to improve on its ability to be poured or injected, or other functional or aesthetic aspects of the finished product), incorporating additives with resin-saturated grounds, heating to working temperature of approximately seventy seven (77) degrees, degassing (though not all end products 1 require degassing) pouring/injecting into mold, curing, demolding, finishing (which may include removing excess material from the molding process, filling air pockets, coating with a sealer for a certain look or protective coating, etc.).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

I claim:

1. A method of manufacturing a composite product with spent coffee grounds, comprising:
   acquiring spent coffee grounds;
   pre-drying the spent coffee grounds;
   drying the spent grounds that have been pre-dried, to form base material;
   organizing the base material by size;
   forming base products from the base material, including a resin product and a hardener product;
   forming a mixed product from the base products; and
   forming a final product from the mixed product, wherein the final product is the composite product,
   wherein organizing the base material by size includes:
      screening or sifting the base material into fine and course granules;
      vacuum sealing the spent grounds based on size; and
      storing the spent grounds.

2. The method of claim 1, wherein acquiring spent coffee grounds includes:
   storing the spent grounds in a recycling receptacle; and
   removing inorganic material.

3. The method of claim 1, wherein pre-drying the spent coffee grounds includes:
   draining the spent grounds of water;
   air drying the spent grounds; and
   transferring the spent grounds into a drying vat.

4. The method of claim 1, wherein drying the spent coffee grounds includes:
   monitoring a moisture content of the spent grounds until a target moisture content is obtained;
   transferring the spent grounds into a powered dryer;
   transferring the spent grounds onto a baking pan;
   transferring the pan into a humidity-controlled environment; and
   periodically agitating or mixing the spent grounds.

5. The method of claim 4, wherein transferring the pan into the humidity controlled environment includes transferring the pan into an oven.

6. The method of claim 4, wherein drying the spent coffee grounds further includes utilizing open air convection, conduction, radiation.

7. The method of claim 1, wherein organizing the base material by size further includes milling a quantity of the base material into a flour.

8. The method of claim 1, wherein forming the resin product includes:
   mixing resin with one or more of flour, fine, and course granules of the base material to define a resin product; and
   degassing the resin product.

9. The method of claim 8, wherein degassing the resin product includes one or both of:
   manual degassing; and
   powered degassing.

10. The method of claim 1, wherein forming the hardener product includes:
   mixing a hardener with one or more of flour, fine, and course granules of the base material to define the hardener product; and
   degassing the hardener product.

11. The method of claim 1, wherein forming the mixed product from the base products includes:
   heating the resin product and the hardener product to a first working temperature;
   mixing the resin and hardener products with each other; and
   degassing the mixed product.

12. The method of claim 11, wherein forming the mixed product from the base products further includes introducing one or more additives into the mixed product.

13. The method of claim 11, wherein degassing the mixed product includes one or both of:
   manual degassing; and
   powered degassing.

14. The method of claim 1, wherein forming the final product from the mixed product includes one or more of:
   pouring the mixed product into a mold;
   pouring the mixed product into an injection molding device; and
   forming a filament for additive manufacturing.

15. The method of claim 14, wherein forming the final product from the mixed product includes:
   pouring the mixed product into the mold;
   introducing a structural insert in the mixed product that is in the mold; and
   machining a product of the mold into the final product.

16. The method of claim 14, wherein forming the final product from the mixed product includes:
   pouring the mixed product into the injection molding device; and
   injection molding the final product.

17. The method of claim 14, wherein forming the final product from the mixed product includes:
   forming the filament for additive manufacturing; and
   additively manufacturing the final product.

18. The method of claim 14, further comprising coating the final product in a resin-based colorant to change its appearance.

19. A composite product formed by a method according to claim 1.

* * * * *